Patented Feb. 23, 1926.

1,574,363

UNITED STATES PATENT OFFICE.

ROBERT CALVERT, OF LOMPOC, CALIFORNIA, ASSIGNOR TO THE CELITE COMPANY, OF LOS ANGELES, CALIFORNIA, A CORPORATION OF DELAWARE.

SILICEOUS ALKALINE-EARTH PRODUCT AND PROCESS OF MAKING THE SAME.

No Drawing.  Application filed December 1, 1923. Serial No. 678,029.

*To all whom it may concern:*

Be it known that I, ROBERT CALVERT, a citizen of the United States, residing at Lompoc, in the county of Santa Barbara and State of California, have invented a new and useful Siliceous Alkaline-Earth Product and Process of Making the Same, of which the following is a specification.

This invention relates to the production and use of a new composition of matter adapted for use in filtration, decolorizing, de-emulsification, and for other purposes.

The main object of the invention is the preparation of a filtering, decolorizing and purifying material from diatomaceous earth or other siliceous powder, which product has the advantage of allowing a greater amount of liquid to be filtered or purified per cycle, an increased decolorizing action and the economic advantage of being of greater bulk and thereby greater output per pound of material than is now the case with all known filter-aids.

In many industrial operations it is customary to use raw or prepared diatomaceous earth in powdered form, fullers earth, bleaching clays or carbons for filtering or decolorizing the liquids being treated, as the case may be. Diatomaceous earth has been most extensively used, usually in the form of a finely disintegrated powder derived from the raw earth (although calcined and otherwise treated forms are also used) in the clarification, sterilization and dehydration of syrups, animal, vegetable and mineral oils, waste and other industrial liquids and solutions. The diatomaceous earth is generally added to the solution or liquid being treated and the resulting mixture filtered through some approved filtration apparatus or separating means in which a separation is made between suspended solid, colloidal or gummy matter and the liquid. Because of the high porosity of the diatomaceous earth, the filtering surfaces do not slime or become impenetrable because of the accumulation of slimes thereon, since the diatomaceous earth is homogeneously distributed throughout the cake and this formation enables large batches of material to be filtered through a single filter press without cleaning it.

My invention pertains to the manufacture of an improved filter aid which is more porous than raw diatomaceous earth and therefore enables greater quantities of liquid to filter through its porosities. The process consists, briefly in heating a mixture of a siliceous finely divided material capable of reacting as hereinafter described, preferably, diatomaceous earth (also known as kieselguhr, infusorial earth, tripoli, fossil flour, etc.) with the hydroxide of an alkaline earth metal, such as lime, in the presence of water. The porosity is most easily demonstrated by the following comparison of volumes, an equal weight of diatomaceous earth being used in each case. 10 gr. of disintegrated diatomaceous earth when boiled in 500 c. c. distilled water and allowed to settle in a 500 c. c. graduate, occupied a volume of 33 c. c. When 10 gr. of similar diatomaceous earth is boiled with 5 gr. of quicklime, in 500 c. c. of water, and allowed to settle in a 500 c. c. graduate, the volume occupied is 375 c. c., the expansion due to boiling with lime corresponding to an increase of more than 1000% of the original volume.

The material from this laboratory test was then shaken up with supernatant liquid and poured quickly into a Buchner funnel fitted to an evacuated flask. Under these conditions 415 seconds were required to filter the untreated diatomaceous earth and 9 seconds with the treated earth. The one rate of filtration is approximately 4600% that of the former. The greater bulk of the treated material is indicated in the fact that the thickness of cake left on the paper was 12/16 of an inch for the treated and only 3/16 of an inch for the untreated.

A similar, though presumably not as great, increase in the rate of filtration will be experienced in the filtration of sewage, oils, fruit juices, beet and cane juices, syrups, and other liquids and solutions in industrial work.

Thus, I have found a different result quantitatively in the case of sugar solution from that found with the more dilute liquors mentioned above. Fifty four and a half grams diatomaceous earth were boiled gently for three hours with twenty seven and two tenths grams lime in eight pounds water. Then, the solids were allowed to settle for an hour, the clear supernatant liquor was siphoned off to the sewer, and the residue added to 24 lbs. raw sugar along with enough fresh water to make a 60% sugar solution by weight. The whole mixture was then warmed to 80° C., and forced through a filter with a filtering area of 0.18 square feet, at 40 pounds pressure. In 30 minutes time there was filtered 3.3 times as much liquor as with a mix which was identical except that the 54.5 g. diatomaceous earth had not been treated with lime.

The filtrate from the lime-treated diatomaceous earth showed a much lighter color than the filtrate from untreated diatomaceous earth. This bleaching action of the diatomaceous earth was found to increase with the proportion of lime used in the treatment of the diatomaceous earth. Thus equal weights of lime and earth gave a product of more pronounced decolorizing action than did the earth treated with only half its weight of lime.

My invention should not be limited by any theory as to exact mechanism of this reaction. It is highly probable, however, that the lime hydrate combines with the finely divided and therefore highly reactive silica to form a hydrated calcium silicate as a gelatinous coating on the surface of the minute particles. Because of the amount of water combined as a hydrate with the calcium silicate, or because of the amount of water absorbed in the gelatinous product, or because of some dispersive force such as electrical repulsion in a colloid, the product is not so compact or dense as is the untreated powder. The decolorizing power is presumably due to the colloidal porosity or adsorption by the calcium silicate gel.

The process is not limited to the illustrative examples given above, or to the series of changes suggested as a plausible explanation of the process. I may use some other siliceous filtering or decolorizing medium which will react in substantially the same manner with warm milk of lime in such manner as to show an increase in efficiency as a filtering medium or decolorizer in the manner above described. Also, I may substitute lime by other oxides or hydroxides of the alkaline earth metals, particularly by such compounds of magnesium, strontium or barium, even though such substitutions are not to be considered scientifically or economically desirable at the present time.

In the practical application of my invention, those industrial plants which require a filter-aid in the purification, clarification or other treatment of their liquids may install simple apparatus for the individual production of my improved filter-aid.

The only equipment necessary may consist of two storage bins; one for the raw disintegrated diatomaceous earth and the other for powdered or crushed quick lime, and two tanks of optional capacity, heated by means of steam, having means for supplying water thereto, and suitable agitators. In this equipment a batch of diatomaceous earth and from 5 to 80% of lime on weight of diatomaceous earth may be cooked in one tank while the filtration system is being supplied by the already prepared filter-aid from the other. In using my new filter-aid it may be added in the wet state in predetermined amounts to the blow up tanks or agitator in which it is intimately mixed with the solution being filtered and this suspension then sent to the filter presses for clarification.

In case filtration operations would be impaired by the injection of water together with the slurry of prepared filter-aid, another liquid, forming part of the industrial process may be used in cooking the lime diatomaceous earth mixture; for instance in the filtration of sewage, it may not be desirable to add fresh water to the system because of evident practical considerations; and a portion of the sewage itself, or of filtrate from the sewage, or wash water from a filter-press may be used for the purpose of boiling the lime and diatomaceous earth mixture. It is of course evident that in order to produce the above described effect, the liquid so used must be an aqueous liquid, or one in which at least some water is present.

Certain other operations such as, for instance, the dehydration of oils by diatomaceous earth, may be most advantageously performed by using a filter-aid prepared by boiling lime and diatomaceous earth and then drying the resulting filter-aid in a suitable manner. The product then is in a dry powdered form and does not introduce any liquid matter whatsoever. Or, a part only of the water may be removed, as by centrifuging, before adding the prepared filter-aid to the liquor to be filtered. The dried or partially dried product is adapted for use for various purposes in the art, and as a substitute for untreated, or otherwise treated diatomaceous earth, for example it can be used as an absorbing material, for a filler, or for heat insulation.

This invention therefore provides for manufacturing and using an improved filter-aid which gives increased rate of flow, saves time in filtration operation, makes it possible to use smaller amounts of filter-aid than was heretofore possible, and filters and in certain cases decolorizes at one operation. Enough water or liquid should be used in the cooking operation to contain the swollen or resulting filter-aid. I prefer to use at least 275 pounds of water per 100 pounds of diatomaceous earth. The lime reacts more rapidly when finely ground and for most industrial work from 30 to 100% of lime (weighed before slaking) on the weight of diatomaceous earth should be used. The temperature of cooking may vary with conditions of pressure and time, although I prefer to use 90 to 105° C. as the temperature of reaction.

It will be seen from the above described examples that the mixture of lime and diatomaceous earth is heated or boiled in the presence of an excess of water, which prevents cohesion and hardening of the solid material into a compact mass. The boiling action also agitates the mixture to still further prevent cohesion of the solid particles, and this may also be supplemented by mechanical or other agitating means as described, if desired. The solids are therefore maintained in finely divided condition and may be used wet in filtering operations, or the residual water may be removed to form a substantially dry powder for use as a filter-aid.

What I claim is:

1. A finely divided product comprising the product of heating a mixture of finely divided diatomaceous earth, an hydroxide of an alkaline earth metal, and water.

2. The improved filter-aid which consists of diatomaceous earth which has been treated with an hydroxide of an alkaline earth metal in the presence of water and applied heat, previous to mixing with the liquid to be filtered.

3. The improved filter-aid which consists of diatomaceous earth which has been treated with lime suspended in water in the presence of applied heat, previous to mixing with the liquid to be filtered.

4. The material for use in filtration which consists of diatomaceous earth which has been boiled with lime in a liquid previous to mixing with the liquid to be treated.

5. A new filtration medium prepared by heating a mixture of two parts powdered diatomaceous earth, 100 parts water and 1 part lime by weight until substantially all of the lime has combined with the silica.

6. A new filtering and decolorizing agent consisting of diatomaceous earth which has been swollen in volume by treatment with lime.

7. A composition of matter adapted for use in filtration, consisting of a mixture of water and a product of reaction of a hydroxide of an alkaline earth metal with diatomaceous earth in the presence of hot water.

8. A composition of matter adapted for use in filtration, consisting of a mixture of water and a product of reaction of lime with diatomaceous earth in the presence of hot water.

9. A finely divided product consisting of the product of heating a mixture of finely divided diatomaceous earth, an hydroxide of an alkaline earth metal, and an aqueous liquid.

10. The process of making a composition of matter for filtration and other purposes; which comprises heating a mixture of finely divided diatomaceous earth, an hydroxide of an alkaline earth metal, and water; said diatomaceous earth being maintained in finely divided condition during such heating operation.

11. The process of making a composition of matter for filtration and other purposes; which comprises heating and agitating a mixture of finely divided diatomaceous earth, an hydroxide of an alkaline earth metal, and water.

12. The process of making a composition of matter for filtration and other purposes which comprises heating and agitating a mixture of finely divided diatomaceous earth, lime and water.

13. The process of producing a finely divided article of manufacture consisting in boiling lime and diatomaceous earth in the presence of water.

14. A finely divided filter aid comprising the product of boiling lime and diatomaceous earth in the presence of water.

15. The process of making a filter aid; consisting in heating a mixture of finely divided diatomaceous earth, an hydroxide of an alkaline earth metal, and water; and then removing uncombined water.

16. A finely divided filter aid comprising a product produced by heating a mixture of finely divided diatomaceous earth, an hydroxide of an alkaline earth metal, and water, and drying the resultant product.

17. An article of manufacture comprising a finely divided product produced by heating a mixture of finely divided diatomaceous earth, an hydroxide of an alkaline earth metal, and water, and then drying the product of such reaction.

18. As an article of manufacture a finely divided material; produced by heating finely divided siliceous material capable of reacting with an hydroxide of an alkaline earth metal, in the presence of such an hydroxide and water.

19. A finely divided product comprising the product obtained by heating finely divided siliceous material capable of reacting with an increase of volume when so treated, with an hydroxide of an alkaline earth metal in the presence of water.

20. The herein described process, consisting in heating finely divided siliceous material capable of reacting with an hydroxide of an alkaline earth metal in the presence of such an hydroxide and water.

21. The process of making a composition of matter for filtration and other purposes, which comprises agitating a finely divided siliceous material capable of reacting with an increase of volume when so treated, with an hydroxide of an alkaline earth metal in the presence of water.

22. The process of making a filter-aid consisting in heating a mixture of lime, water, and a finely divided siliceous material capable of reacting with an increase in volume when so treated, to produce a finely divided product.

23. The process of making a filter-aid consisting in heating a mixture of finely divided diatomaceous earth, an hydroxide of an alkaline earth metal, and an aqueous liquid, the solids being maintained in finely divided condition during such heating.

24. The process of preparing a material for use as a filter aid in filtration of an aqueous liquid, which comprises heating finely divided diatomaceous earth and lime in a portion of such liquid.

In testimony whereof I have hereunto subscribed my name this 16th day of November, 1923.

ROBERT CALVERT.